United States Patent
Bacchiani et al.

(10) Patent No.: US 8,010,360 B2
(45) Date of Patent: *Aug. 30, 2011

(54) SYSTEM AND METHOD FOR LATENCY REDUCTION FOR AUTOMATIC SPEECH RECOGNITION USING PARTIAL MULTI-PASS RESULTS

(75) Inventors: Michiel Adriaan Unico Bacchiani, Summit, NJ (US); Brian Scott Amento, Morris Plains, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/638,604

(22) Filed: Dec. 15, 2009

(65) Prior Publication Data

US 2010/0094628 A1   Apr. 15, 2010

Related U.S. Application Data

(63) Continuation of application No. 10/742,852, filed on Dec. 23, 2003, now Pat. No. 7,729,912.

(51) Int. Cl.
   *G10L 15/04* (2006.01)
(52) U.S. Cl. .................. 704/252; 704/235; 704/276
(58) Field of Classification Search .............. 704/231, 704/235, 244, 239, 240, 251, 255, 270, 252, 704/276, 246, 257
See application file for complete search history.

(56) References Cited

U.S. PATENT DOCUMENTS

| | | | |
|---|---|---|---|
| 6,122,613 A | 9/2000 | Baker | |
| 6,487,534 B1 | 11/2002 | Thelen et al. | |
| 6,950,795 B1 | 9/2005 | Wong | |
| 7,058,573 B1 | 6/2006 | Murveit et al. | |
| 7,184,957 B2* | 2/2007 | Brookes et al. | 704/246 |
| 7,440,895 B1* | 10/2008 | Miller et al. | 704/244 |
| 2003/0028375 A1 | 2/2003 | Kellner | |
| 2004/0138885 A1 | 7/2004 | Lin | |

OTHER PUBLICATIONS

Steve Whittaker et al., "SCANMail: a voicemail interface that makes speech browsable, readable and searchable," Proceedings of the SIGCHI conference on Human factors in computing systems: Changing our world, changing ourselves, Apr. 20-25, 2002, Minneapolis, Minnesota.

* cited by examiner

*Primary Examiner* — Huyen X. Vo

(57) ABSTRACT

A system and method is provided for reducing latency for automatic speech recognition. In one embodiment, intermediate results produced by multiple search passes are used to update a display of transcribed text.

9 Claims, 2 Drawing Sheets

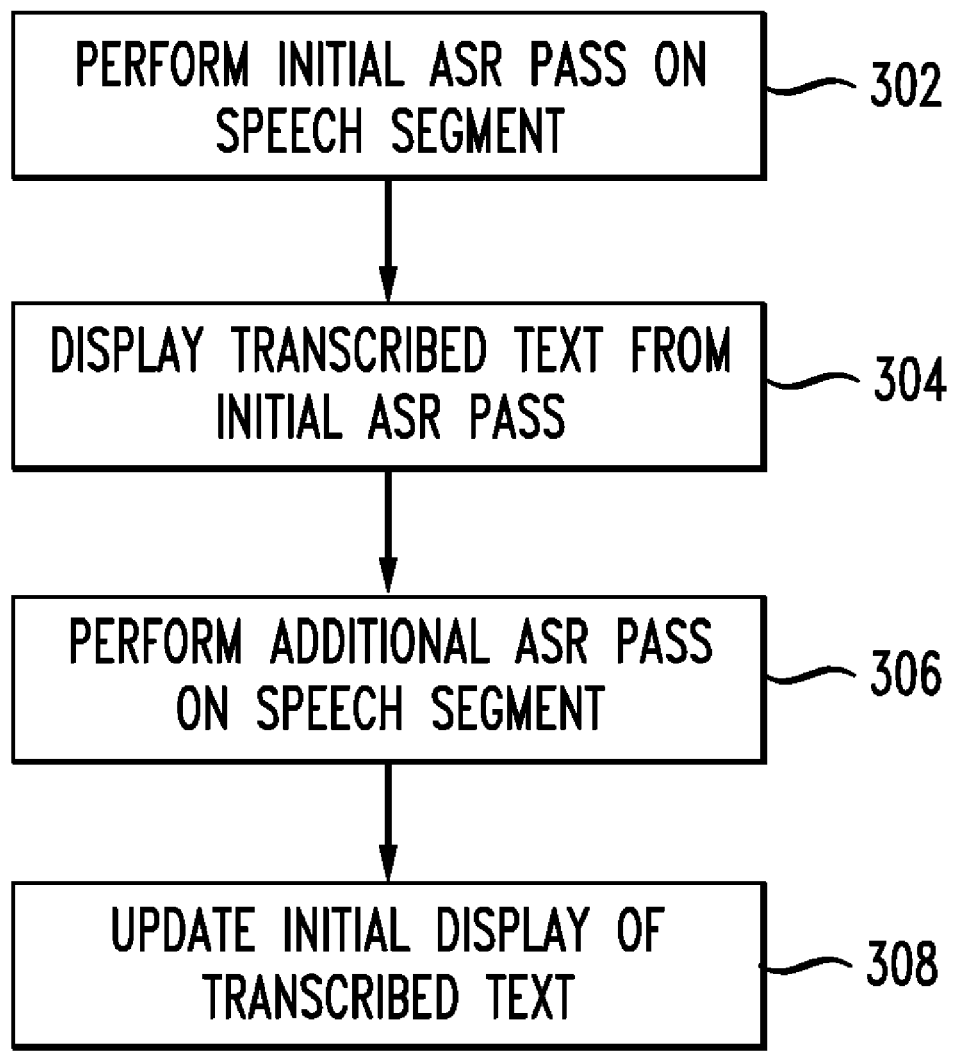

SYSTEM AND METHOD FOR LATENCY REDUCTION FOR AUTOMATIC SPEECH RECOGNITION USING PARTIAL MULTI-PASS RESULTS

PRIORITY

The present application is a continuation of Ser. No. 10/742,852, filed Dec. 23, 2003, the contents of which is incorporated herein by reference in its entirety.

BACKGROUND

1. Field of the Invention

The present invention relates generally to speech recognition systems and, more particularly, to a system and method for latency reduction for automatic speech recognition using partial multi-pass results.

2. Introduction

Automatic speech recognition (ASR) is a valuable tool that enables spoken audio to be automatically converted into textual output. The elimination of manual transcription represents a huge user benefit. Thus, whether applied to the generation of transcribed text, the interpretation of voice commands, or any other time-saving application, ASR is presumed to have immense utility.

In practice, however, ASR comes at a great computational cost. As computing technology has improved, so has the complexity of the computation models being applied to ASR. Computing capacity is rarely wasted in the ever continuing search for accuracy and speed in the recognition of speech.

These two criteria, accuracy and speed, in particular represent the thresholds by which user adoption and acceptance of the technology are governed. Quite simply, if the promise of the technology exceeds the practical benefit in real-world usage, the ASR technology quickly moves into the category of novelty, not usefulness.

Conventionally, high accuracy ASR of continuous spontaneous speech requires computations taking far more time than the duration of the speech. As a result, a long latency exists between the delivery of the speech and the availability of the final text transcript. What is needed therefore is a mechanism that accommodates real-world ASR latencies without sacrificing application usefulness.

SUMMARY

In accordance with the present invention, a process is provided for reducing latency for automatic speech recognition. In one embodiment, intermediate results produced by multiple search passes are used to update a display of transcribed text.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flowchart of a method of the present invention.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Access to speech data is becoming increasingly prevalent due to the ubiquitous nature of digitized storage. In particular, digitized storage has enabled public, corporate, and private speech data to be easily transferred over public and private networks. With increasing frequency, speech content is being recorded, archived and distributed on demand to interested users.

While access to speech content is increasing, its usability has remained relatively stagnant. This results from the nature of speech as a serial medium, an inherent characteristic that demands serial playback in its retrieval. Even with conventional technologies that can increase the rate of playback, the fundamental disadvantages in access to the speech content remain.

It is a feature of the present invention that access to speech content is improved through the removal of inherent difficulties of speech access. As will be described in greater detail below, serial access to speech content is replaced by an efficient graphical user interface that supports visual scanning, search and information extraction of transcription text generated from the speech content.

As is well known in the art, automatic speech recognition (ASR) represents an evolving technology that enables the generation of transcription data from speech content. ASR has shown increasing potential as new generations of ASR technology have leveraged the continual advances in computing technology. Notwithstanding these advancements, ASR technology has not yet broken into a full range of uses among every day tasks. This has likely resulted due to fundamental issues of transcription accuracy and speed.

As would be appreciated, typical applications of ASR technology are faced with a tradeoff between transcription accuracy and speed. Quite simply, increased transcription accuracy often requires more complex modeling (e.g., acoustic and language model), the inevitable consequence of which is increased processing time. This increased processing time comes at an ever-increasing penalty as it goes significantly beyond the real time (or actual) rate of the speech content. The delay in completion (or latency) of the speech processing can often become the primary reason that bars a user from accepting the application of the ASR technology in a given context.

Figure 1:
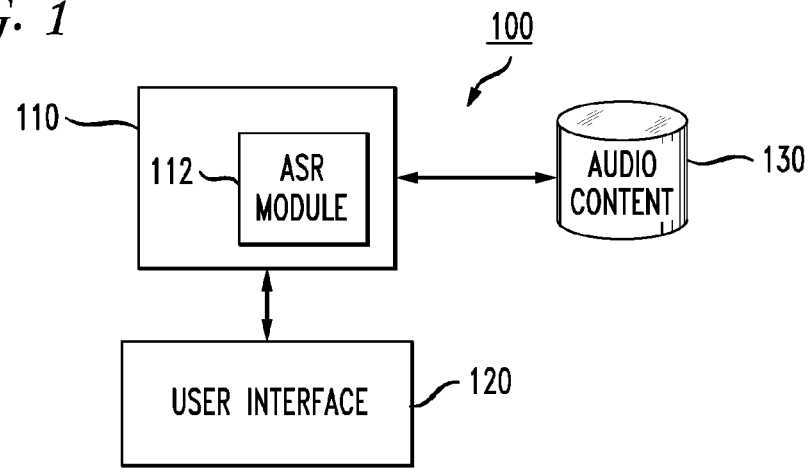
FIG. 1 illustrates an embodiment of a system of the present invention.

User acceptance being a key, what is needed is a user interface that enhances a user's experience with transcription data. Prior to illustrating the various features of the present invention, reference is made first to the generic system diagram of FIG. 1. As illustrated, system 100 includes a processing system 110 that includes ASR module 112. In one embodiment, processing system 110 is a generic computer system. ASR module 112 is generally operative on spoken audio data stored in audio source 130. As would be appreciated, audio source 130 may be representative of a storage unit that may be local or remote to processing system 110. In other scenarios, audio source 130 may be representative of a transmission medium that is providing live content to processing system 110. Upon receipt of audio data from audio source 130, ASR module 112 would be operative to generate text data that would be displayable in user interface 130.

Figure 2:
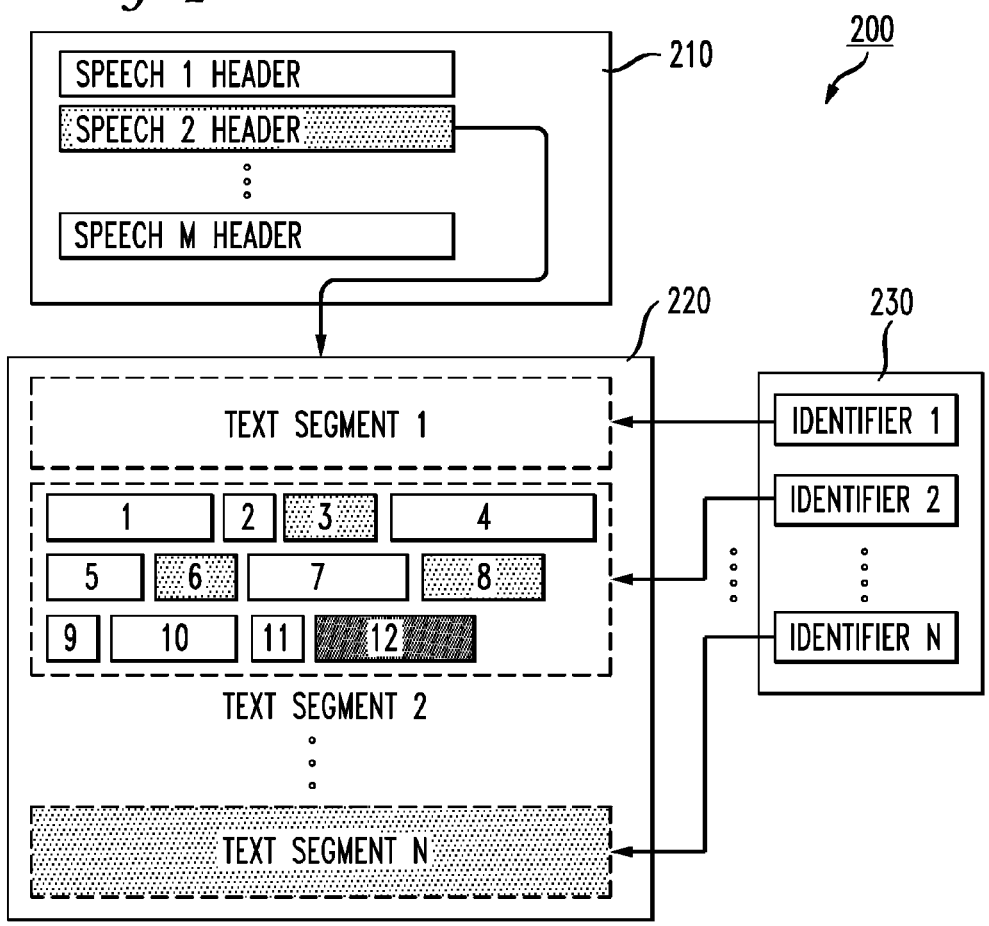
FIG. 2 illustrates an embodiment of a user interface for navigating transcription data.

An embodiment of user interface 130 is illustrated in FIG. 2. As illustrated, user interface 200 includes three primary element areas, including speech header section 210, text transcription section 220, and text segment identifier section 230. In general, speech header section 210 includes some form of identifying information for various speech content (e.g., public speeches, lectures, audio books, voice mails, etc.) that is accessible through user interface 200. In one embodiment, selection of a particular speech header in speech header section 210 initiates replay of the speech content along with the generation of transcription text that appears in transcription section 220. As illustrated in FIG. 2, selection of Speech 2 Header produces a display of its corresponding transcription text in transcription section 220.

In an example related to a voice mail embodiment, speech header section 210 could be designed to include information such as the caller's name, the date of the voice mail, the length of the voice mail, etc; text transcription section 220 could be designed to include the transcription text generated from a selected voice mail; and speech header section 230 could be designed to include keywords for segments of the selected voicemail.

As further illustrated in FIG. 2, transcription section 220 can be designed to display transcription text as text segments 1-N. In one embodiment, text segments 1-N are formatted into audio paragraphs using an acoustic segmentation algorithm. In this process, segments are identified using pause duration data, along with information about changes in acoustic signal energy. As would be appreciated, the specific formatting of the transcription text into text segments 1-N would be implementation dependent in accordance with any criteria that would be functionally useful for a viewing user.

In one embodiment, text segments can also have associated therewith an identifier that relates to the text segment. These identifiers are displayed in text segment identifier section 230 and can be collectively used to enable a user to intelligently navigate through the transcribed text. As would be appreciated, the specific form of the text segment identifiers would be implementation dependent in accordance with any criteria that would be functionally useful for a viewing user. In one example, the text segment identifiers could represent one or more keywords that were extracted from the corresponding transcription text segment.

As noted, one of the goals of user interface 200 is to improve upon a user's experience in interacting with transcription text. A significant drawback in this process is the relevant tradeoff between transcription accuracy and speed. Indeed, conventional ASR technology that produces reasonably accurate text can be expected to run at a rate four times that of real time. This delay in the generation of transcription text represents a real impediment to a user's adoption of the technology. It is therefore a feature of the present invention that user interface 200 is designed to accommodate a user's sense of both transcription speed and accuracy. As will be described in greater detail below, this process leverages transcription efforts that incrementally improve upon transcription accuracy.

To obtain high accuracy transcripts for continuous spontaneous speech, several normalization and adaptation algorithms can be applied. These techniques can take into account the specific channel conditions as well as the gender, vocal tract length and dialect of the speaker. The model parameters for the compensation/adaptation model can be estimated at test time in an unsupervised fashion. The unsupervised algorithms use an initial guess at the transcription of the speech. Based on that guess and the audio, an adapted/normalized model is estimated and a re-transcription with the adapted/normalized model improves the accuracy of the transcript. The final, most accurate transcript is obtained by iterative transcription with models adapted/normalized in multiple stages. Hence this process can be referred to as multi-pass transcription.

The ASR transcription passes are computationally expensive. To express their cost, the processing time is related to the duration of the speech and the quotient of the two expresses the computation cost in terms of a real-time factor. In one embodiment, to reduce the computational cost of repeated transcription passes, the initial search pass produces a word-graph representing a few of the possible transcriptions deemed most likely by the current model. Subsequent transcription passes, using the more accurate adapted/normalized model, only consider the transcriptions enumerated by the word-graph, dramatically reducing the computational cost of transcription.

The first recognition pass, which uses an unadapted/unnormalized model and performs an unconstrained search for the transcript, takes about 4 times real-time time. On an independent test set, the word-accuracy of this transcript was 74.2%. Besides an initial guess of the transcript, this search pass produces a word-graph that is used in subsequent search passes.

The second recognition pass estimates the gender and vocal tract of the speaker based on the audio and the transcript produced in the first pass. A second search pass is then performed, constrained by the word-graph produced by the first pass. In one embodiment, this second search pass uses a Gender Dependent (GD), Vocal Tract Length Normalized (VTLN) model (based on the unsupervised gender estimate) and uses VTLN acoustic features (based on the unsupervised vocal tract length estimate). The result of this search pass is a new transcript. The word-accuracy of this second transcript was 77.0% (a 2.8% absolute improvement over the first pass accuracy). The computation cost of this second pass is about 1.5 times real-time.

The third recognition pass uses two adaptation algorithms to adapt to the channel and speaker characteristics of the speaker. Again, this is performed in an unsupervised way, using the audio and the transcript of the second (VTLN) pass. It estimates two linear transformations, one applied to the acoustic features using Constrained Model-spade Adaptation (CMA) and one applied to the model mean parameters using Maximum Likelihood Linear Regression (MLLR). First the CMA transform is estimated using the VTLN transcript and the audio. Then a search pass is performed, again constrained by the word-graph from the first pass, using the CMA rotated acoustic features and the GD VTLN model. The transcript from that pass is then used with the audio to estimate the MLLR transform. After rotating the model means using that transform, another word-graph constrained search pass is executed that provides the third pass transcript. The total processing time of this adaptation pass is about 1.5 times real-time. The adaptation pass transcript is the final system output and improves the accuracy to 78.4% (a 1.4% absolute improvement over the VTLN pass result).

Since the first pass still represents a large latency of 4 times real-time, an initial search pass is performed before running the first pass, referred to as the Quick Pass. This output from this pass is not used in the multi-pass recognition process but is simply used as a low latency result for presentation to the user. It can be obtained in about one times real time. Here, the exact rate of the initial pass as being at real time or slightly greater than real time is not a critical factor. Rather, one of the goals of the initial pass is to produce a result for the user as quickly as possible.

The run-time reduction of the initial pass as compared to the first pass can be obtained by reducing the search beam used internally in the recognizer. As a result, the speed-up comes at an accuracy cost: the Quick Pass accuracy was 68.7% (a 5.5% absolute degradation compared to the first pass result).

It is a feature of the present invention that the intermediate guesses at the transcript of the speech can be presented to the user at lower latency than the final, most accurate transcript. In other words, the results of each of the search passes enables the developer to produce a more usable interface by presenting the best quality results available at the time of the user request.

Thus, in one embodiment, the particular search pass can be indicated in the interface by using color shading or explicitly indicating which transcript the user is currently viewing. For example, as illustrated in FIG. 2, Text Segment N is displayed in a different shade or color, thereby indicating that further, more accurate transcription results would be forthcoming. In other embodiments, the user interface can be designed to show the user how many additional transcription passes are forthcoming, the estimated transcription accuracy rate, etc.

With this approach, when a one-minute speech file is being processed, a rough transcript can be displayed in the interface within the first minute, so that users can begin working with the intermediate results. As each pass is completed, the display is updated with the new information. After eight minutes, for example, all processing may be completed and the final transcript would then be shown in text transcription section 220.

In one embodiment, accuracy information from one or more of the multiple search passes can also be used on a word or utterance level. Illustration of this feature is provided by Text Segment 2, which is broken down into words and/or utterances 1-12. Here, accuracy information (e.g., confidence scores) generated by a particular search pass can be used to differentiate between the estimated accuracy of different words or utterances. For example, in one embodiment, words or utterances having confidence scores below a certain threshold can be targeted for differential display, such as that shown by words/utterances 3, 6, 8, and 12. As would be appreciated, various levels of differentiation can be defined with associated levels of shading, colors, patterns, etc. to communicate issues of relative accuracy in the transcribed text. In this manner, the accelerated display of transcribed text would not hinder the user in his appreciation of the data. Indeed, the highlighting of known or estimated accuracy issues, would enable the user to listen to specific portions of the speech content to discern words or utterances on his own. For example, the user interface can be designed to replay a specific portion of the speech content upon selection of a highlighted portion of the transcribed text. Thus, it is a feature of the present invention that the user can work with transcribed text earlier than he otherwise would be permitted to do so, and in a manner that is not hindered by the lower accuracy of an initial or intermediate search pass.

Having described an exemplary user interface enabled by principles of the present invention, a brief description of a process of the invention is now described with reference to the flowchart of FIG. 3. As illustrated, the process begins at step 302 where an initial ASR pass is performed on a speech segment. This initial ASR pass can represent any search pass that produces discernible transcribed output. At step 304, this transcribed output is displayed.

Next, at step 306, an additional ASR pass is performed on the speech segment. As would be appreciated, this additional ASR pass can be initiated after completion of the initial ASR pass, or can be performed contemporaneously with the initial ASR pass. Regardless, it is expected that the additional ASR pass would produce discernible transcribed output after the initial ASR pass. At step 308, the transcribed output from the additional ASR pass is used to update the initial display of transcribed text.

It should be noted that the particular manner in which the transcribed text from the additional ASR pass is used to update the display is implementation dependent. In one embodiment, the displayed text itself would be modified. In other embodiments, an indicator on the display reflective of the state of a multi-pass search strategy would be updated. In still other embodiments, the relative highlighting or other communicated differentiator would be modified.

Embodiments within the scope of the present invention may also include computer-readable storage media for carrying or having computer-executable instructions or data structures stored thereon. Such computer-readable storage media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the invention may have applicability in a variety of environments where ASR may be used. Therefore, the invention is not limited to ASR within any particular application. Accordingly, the appended claims and their legal equivalents only should define the invention, rather than any specific examples given.

What is claimed is:

1. A method for reducing latency in automatic speech recognition, the method comprising:
    transcribing speech data using a first automatic speech recognition pass, which operates at a first transcription rate near real time, to produce first transcription data;
    displaying the first transcription data on a display unit;
    determining, via a processor of a computing device, how many additional automatic speech recognition transcription passes are needed, wherein the additional automatic speech recognition transcription passes are slower and more accurate than the first automatic speech recognition pass, to produce at least a second transcription data; and
    displaying an indication of how many additional automatic speech recognition transcription passes are forthcoming that will update the first transcription data displayed on the display unit.

2. The method of claim 1, wherein the first automatic speech recognition pass operates at real time.

3. The method of claim 1, wherein the first automatic speech recognition pass operates at greater than real time.

4. The method of claim 1, wherein displaying the first transcription data further comprises displaying an indicator that signifies that more accurate transcription data is being generated.

5. The method of claim 1, wherein the first transcription data is displayed in at least one of a different color and a different shade as compared to the indication.

6. The method of claim 1, wherein portions of the first transcription data having a relatively lower confidence score are distinctly displayed as compared to other portions of the first transcription data having a relatively higher confidence score.

7. The method of claim 6, wherein the portions of the first transcription data having the relatively lower confidence score are displayed in a darker shade as compared to the other portions of the first transcription data having the relatively higher confidence score.

8. The method of claim 6, wherein the portions of the first transcription data having the relatively lower confidence score enable a user to listen to corresponding portions of the speech data.

9. The method of claim 1, wherein the additional automatic speech recognition transcription passes of the speech data are normalized automatic speech recognition passes.

* * * * *